United States Patent [19]

Trinidad et al.

[11] Patent Number: 4,876,865

[45] Date of Patent: Oct. 31, 1989

[54] AUTOMOBILE ANTI-THEFT, BRAKE-LOCKING DEVICE

[76] Inventors: Antonio Trinidad, HC-763 B2N.3321, Patillas, P.R. 00723; Victor M. Zayas Luna, Box 674, Arroyo, P.R. 00615; Miguel A. Rey, Urb. Valle Alto; Calle 4E-18, Patillos, P.R. 00723

[21] Appl. No.: 224,815

[22] Filed: Jul. 27, 1988

[51] Int. Cl.$^4$ .............................................. B60R 25/00
[52] U.S. Cl. ........................................ 70/203; 70/237
[58] Field of Search ............ 180/287; 70/237, 200-203

[56] References Cited

U.S. PATENT DOCUMENTS

| | | | |
|---|---|---|---|
| 1,335,532 | 3/1920 | Sleeper | 70/203 |
| 1,385,479 | 7/1921 | Stanley | 70/203 |
| 1,402,150 | 1/1922 | DiNapoli | 70/203 |
| 1,430,325 | 9/1922 | Rose | 70/203 |
| 1,442,203 | 1/1923 | Williams et al. | 70/202 |
| 1,444,379 | 2/1923 | Jones | 70/202 |
| 1,519,534 | 12/1924 | Erickson | 70/202 |
| 1,967,998 | 7/1934 | Franke et al. | 70/200 |
| 2,471,293 | 5/1949 | Truesdell | 70/202 |

FOREIGN PATENT DOCUMENTS

| | | | |
|---|---|---|---|
| 999336 | 1/1952 | France | 70/200 |
| 2023520 | 1/1980 | United Kingdom | 70/203 |

Primary Examiner—Lloyd A. Gall
Attorney, Agent, or Firm—Milton S. Gerstein

[57] ABSTRACT

An anti-theft device for a vehicle in which a device is provided that locks the brake pedal of the vehicle in a downward, brake-actuating state, to thereby prevent operation of the vehicle. The device includes a pair of pivotal plate members, which are locked to the brake pedal proper via a first locking arrangement, while a second locking arrangement fixedly connects and locks a lower portion of the second downwardly extending plate member to the floor of the vehicle, such second lock keeping and locking the device and the brake pedal in a lowered depressed state thereof, where the brakes are in their engaged state. The locking arrangements are operated by a key. Also provided is an ancillary brake light switch for rending de-energized the rear brake lights of the vehicle when the device of the invention is attached to the brake pedal, and the brake pedal is in its downward brake-actuating state, in order to prevent drainage of the vehicular battery.

10 Claims, 1 Drawing Sheet

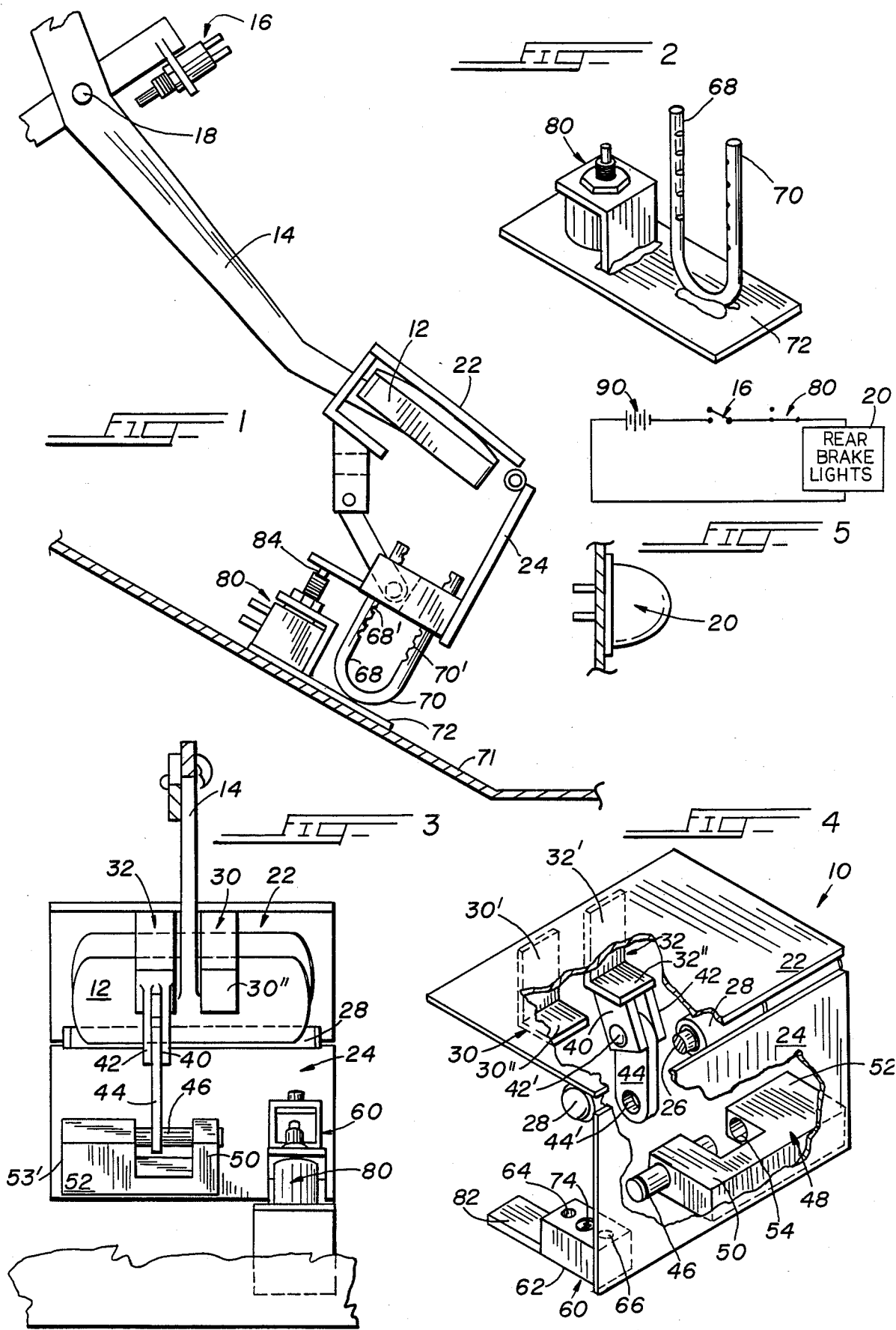

AUTOMOBILE ANTI-THEFT, BRAKE-LOCKING DEVICE

BACKGROUND OF THE INVENTION

The present invention is directed to a device for preventing the theft of an automobile, truck or other vehicle by locking the brake pedal of the vehicle in its downward, brake-engaging state, to thereby prevent any movement of the vehicle. There are known many anti-theft automobile devices, most of which operate as an alarm upon the unwarranted forced entry into the vehicle itself. There are other anti-theft vehicular devices that electronically prevent the operation of the braking system of the automobile, and there are prior art devices that connect the brake pedal itself to the steering wheel to prevent the operation of either one thereof. However, all of these prior art anti-theft vehicular devices have proven substantially ineffective in the prevention of thefts for various reasons, such as making the electronic anti-theft device inoperative, which is a relatively easy thing to do for an experienced thief, or sawing off the bar connecting the brake pedal to the steering wheel, which also is relatively easy to do for an experienced thief.

The present invention is directed to an anti-theft device that will prevent the operation of the vehicle itself by locking the brake pedal in its locking state to prevent the movement of the vehicle, either in forward or reverse directions, which device, owing to its design and operation, is substantially impervious to removal, other than through the normal way via a key for the locks thereof.

SUMMARY OF THE INVENTION

It is, therefore, the primary objective of the present invention to provide a substantially tamper-proof and burglar-proof anti-theft vehicular device, which device prevents operation of a vehicle either in the forward or reverse directions by keeping the brake pedal of the vehicle depressed in its brake-actuation state, thereby engaging the brake shoes and brake disks of the vehicle to prevent such movement.

It is another objective of the present invention to provide an antitheft device for a vehicle in which access to the locks thereof, preventing removal of the device from the brake pedal of the vehicle, is located to such a degree as to provide substantial prevention of the breaking of the parts thereof or the severing of the locks thereof in order to make inoperative such device.

It is also an objective of the present invention to ensure that, in the depressed, actuated state of the brake pedal, the rear brake lights of the vehicle are made inoperative so as not to drain the vehicular battery.

Toward these and other ends, the anti-theft vehicular device of the present invention includes a brake pedal shoe or clamp comprised of a pair of relatively pivotal plates or parts, the first or brake pedal engaging pivotal plate including a pair of downwardly-extending brackets for sandwiching therebetween the brake pedal lever of the vehicle, which pair of brackets also directly connect the brake pedal shoe to the brake pedal proper. Connected to one of the downwardly-projecting brackets is a first lever portion of a brake pedal lock which is used to physically lock the brake pedal shoe to the brake pedal proper. The other downwardly-extending pivotal plate is provided with the remaining portion of the brake pedal locking mechanism, which operates together with the pivotal lever portion to lock the shoe in place on the pedal proper. The lever portion has a through-hole formed therein for insertion therethrough of a locking shaft provided in the brake pedal lock attached to the downwardly-extending pivotal plate of the brake pedal shoe. When the lever portion is interconnected with the locking shaft, the brake pedal shoe is physically locked and not removable from the brake pedal proper, whether taken in any direction with regards to the brake pedal proper. The second or downwardly extending pivotal plate of the brake pedal shoe is provided with, on its interior or forwardly facing flat surface thereof, a second lock. The floor of the interior of the vehicle is provided with the cooperating portion of this second lock, which cooperating portion in the preferred embodiment includes a pair of upwardly projecting serrated shafts receivable in a pair of through holes formed in the second lock attached to the second downwardly-extending pivotal plate of the brake pedal shoe. The second lock is a conventional lock, whereby the lock is held in its locked state along any portion of the pair of serrated upwardly extending shafts, with removal only by the operation of a key. This cooperating portion of the second lock is juxtapositioned next to the brake pedal proper, toward the door on the drivers side of the vehicle. Also mounted on the interior floor of the vehicle, somewhat forwardly of the serrated prongs of the second lock, is a second brake pedal switch connected in series with the conventional brake pedal switch operatively engaged with the movement of the lever of the brake pedal for operating the rear brake lights. As mentioned, this second brake light switch is mounted in series with the first brake light switch, is automatically depressed upon the locking engagement of the second lock with the serrated member prongs thereof, so that as the brake pedal proper is depressed, and held depressed by the second locking mechanism, the second brake light switch will render the rear brake lights inoperative in order to save the vehicular battery from being drained.

BRIEF DESCRIPTION OF THE DRAWINGS

The invention will be more readily understood with reference to the accompanying drawings, wherein:

FIG. 1 is a side elevational view of the anti-theft vehicular device of the present invention showing the brake pedal shoe thereof attached to a brake pedal proper of a vehicle with both locks of the device locked in place.

FIG. 2 is an isometric view showing the portion of the invention affixed to the interior floor of the vehicle, which portion includes a second brake switch in series with the conventional brake switch attached to the brake lever of the vehicle, and a pair of upwardly projecting serrated prongs forming a portion of a second lock of the invention;

FIG. 3 is a rear elevational view of the device of FIG. 1;

FIG. 4 is an isometric view of the brake pedal shoe of the invention; and

FIG. 5 is an electrical schematic view showing the series-connection of the second brake-light switch with the conventional brake-light switch.

DETAILED DESCRIPTION OF THE INVENTION

Referring now to the drawings in greater detail, FIG. 4 shows the brake pedal locking shoe of the present invention, and is indicated generally by reference numeral 10. This brake pedal locking shoe 10 is affixed to a brake pedal proper indicated by reference numeral 12 in FIG. 1, the brake pedal 12 being at the extremity of an operating brake lever of the vehicle, as seen in FIG. 1. As is conventional, operatively associated with the operating brake lever 14 is a brake light switch 16, which, upon the depression of the brake pedal 12 and the subsequent downward rotation of the operating brake lever 14 via the pivot pin 18, will cause the normally open brake light switch 16 to close, to thereby energize the rear brake light 20 for signaling to trailing vehicles that the brakes have been engaged. The present invention is utilized to keep the brake pedal 12 and the brake lever 14 in its downward, operational state, to thereby lock all four wheels of he vehicle, to thereby prevent either forward or reverse movement of the vehicle, to thereby successfully prevent theft of the vehicle by preventing rotation of any of the wheels thereof.

The brake pedal locking shoe 10 is comprised of two relatively-pivotal parts: A first, upper, brake pedal contacting plate 22, and a downwardly-extending pivotal plate 24. The plates 22 and 24 are pivotal relative to each other in a conventional manner, such as by a pivot post rotatably mounting each of the plates 22 and 24 via annular hollow sleeves 28, alternate ones of which are fixedly connected to the undersurface of the plate 22, and other alternate ones of which are connected to the interior or forward-facing surface of the plate 24, in a manner similar to that by which a hinge of a door allows for the rotational movement of the door relative to the door frame. The dimensions of each of the plates 22 and 24 are such that as to completely cover all sizes of brake pedal proper 12 in use in vehicles, whether automobiles, pickup trucks, vans or the like. The upper, brake pedal engaging plate 22 is provided with a pair of downwardly-projecting L-shaped brackets 30, 32, by which the plate 22 is connected to the brake pedal 12, such being accomplished by the L-shaped brackets 30 and 32 sandwiching therebetween the lateral width of the operating brake lever 14, in the manner clearly shown in FIG. 3. The substantially vertical section 30' and 32' of the brackets 30 and 32 are the portions which prevent the lateral displacement or removal of the brake pedal engaging plate 22, while the substantially horizontal portions 30" and 32" prevent the upward displacement or removal of the brake engaging plate 22 from its engagement with the brake pedal proper 12. Downward movement is prevented, of course, by the actual engagement of the lower surface of the plate 22 with the upper surface of the brake pedal proper 12. Forward and reverse removal of the brake engaging shoe 10 of the invention is effectively prevented by the rearwardly facing surfaces of the portion 30' and 32', as well as the forwardly facing interior surface of the plate 24, when the brake pedal shoe 10 of the invention is in its locked state, to be described below in greater detail.

Projecting downwardly from the horizontal section 32' of the L-shaped bracket 32 is a portion of a first locking device of the invention. This first portion includes a pair of downwardly-extending flat legs 40, 42, interconnected by a pivot pin 42', which pivot pin pivotally mounts a rotatable locking lever 44 constituting a portion of the first locking device of the brake pedal locking shoe 10. The rotatable locking lever 44 includes a through hole 44", through which projects a shaft 46 of the lock. The shaft of the lock is slidably mounted in a locking member proper 48 that is made up of a first leg portion 50 and a wider leg portion 52, the leg portion 50 containing a through-hole through which slides the locking shaft 46, with the second leg portion 52 defining an opening 54 for the sliding reception therein of the end of the male shaft member 46, the insertion of which into the opening 54 automatically locks the shaft 46 in place, to provide a self-locking mechanism. This first lock is of a conventional type, commonly referred to as a "rolling shutter padlock," manufactured by the Ziro Corporation of Italy, which is a self-locking device, unlocked by a key inserted into a cylinder end provided on the second leg portion 52 on the lateral edge surface thereof, facing away from the drivers' door, such lateral surface being indicated by reference number 52' in FIG. 3. FIG. 3 clearly shows how the interlocking parts of this lock are interconnected to lock the brake shoe 10 in place. The brake pedal shoe 10 is removed from the brake pedal proper by insertion of a key into the conventional cylinder of the locking mechanism 48 to release the locking shaft 46, which upon unlocking automatically is forced out into position shown in FIG. 4 via a spring, all of which is conventional, as described above. The first lock 48 is meant to attach the brake shoe 10 to the brake pedal in permanent fashion, so that the brake shoe 10 of the invention is always present and mounted to the brake pedal, so that the anti-theft device of the invention may be readily actuated when leaving the vehicle unattended.

The locking state shown in FIG. 3 is achieved from the unlocked state of FIG. 4, after having attached the upper brake engaging plate 22, as shown in FIG. 1, by rotating the lever 44 in the counter clockwise direction when viewing FIG. 4, relative to the pivot pin 42' of the pair of yokes 40, 42, until the through-hole 44' is substantially coaligned with the opening 54, after which the locking shaft 46 is pushed toward the opening 54, through the hole 44', and finally locked in place after insertion of the end thereof in the opening 54, constituting the opening formed in the locking cylinder proper of the lock 48.

There is also provided a second locking device for the locking brake shoe 10, consisting of a female portion 60, constituted by a block 62 formed with a pair of through openings 64 and 66, best seen in FIG. 4. The block 60 extends forwardly from the interior surface of the interior lower corner surface of the downwardly-extending pivot plate 4, as clearly shown in FIG. 4. Operatively associated with this block 62 is the male portion of the second locking device, which male portion includes a pair of upwardly extending serrated prongs 68, 70 best seen in FIGS. 1 and 2. Each of the prongs 68 and 70 is provided with a series of serrations 68' and 70', the serrations of each of these members facing each other, as clearly shown in FIGS. 1 and 2. The prongs 68 and 70 fit snugly in the through openings 64 and 66 of the block 62 for locking engagement therein via an appropriate locking mechanism provided in the block 60. The second locking device, including the female portion 60 and the male prong portion 68 and 70, is conventional in the art, and is manufactured by Master Lock Company. The prongs 68 and 70 are fixedly secured to the floor 71 of the vehicle via a mounting plate 72. In the preferred embodiment, the prongs 68 and 70 may be formed by a U-shaped member, such as that shown in FIGS. 1 and 2, with the U-base thereof, being fixedly secured to the mounting plate 72. Thus, it may be seen that the brake pedal proper 12 is retained in its downward, operative, brake actuating state by the engagement of the female block member 60 with the male prongs 68, 70, of the second locking device, whereby any kind of movement to the brake pedal proper 12 is prevented.

The device of the invention is therefore provided with two independent locking devices, the first one for actually locking the braking shoe 10 to the brake pedal proper 12, with the second locking device locking the entire brake pedal shoe 10 to the floor of the vehicle to prevent upward movement of the brake pedal 12 proper, where by all four brakes of the vehicle are operatively engaged to prevent any movement of the vehicle.

It is also noted that the positioning of the first and second locking devices is such that access to them is very difficult, thereby making highly unlikely the breaking or severing of these locks in order the make inoperative the brake pedal shoe of the present invention. Access to the first locking device constituted by the parts 48 and 44 is very difficult to achieve owing to the hindrance to access thereto via the plates 22 and 24, as well as to the vehicular floor itself, constituted by the hump of the floor on one side of the first locking device, and the interior wall surface of the interior of the car adjacent the drivers' door. Similarly, when the brake pedal shoe 10 is actually locked to the brake pedal, and held down via the second locking device, the first locking device is not very far from the floor itself juxtapositioned thereagainst, so that there is very little room for a thief to insert his tools in order to sever this first locking arrangement. Likewise, the second locking arrangement constituted by the female block 60 and the male prongs 68 and 70 is also very difficult to access, since on one side thereof is the side wall of the interior of the vehicle adjacent to the drivers' door, while on the other side thereof is the first locking arrangement constituted by the parts 48 and 44. Furthermore, access from the bottom is denied since the second locking arrangement is actually attached to the floor of the vehicle, and access from above is denied via the locking plates 22 and 24 proper. Thus, it is highly unlikely, if not impossible, for a thief to render inoperative either of the two locking arrangements of the present invention, and, even if it were possible, such would be extremely time-consuming, which would most likely discourage the thief from trying after a short time of attempting to make inoperative these locking devices. The second locking arrangement constituted by the male prongs 68, 70 and the female block 62 is also operable by a key, inserted into the slot thereof of the cylinder 74, formed in the block 60 as shown in FIG. 4. As described above, this second locking arrangement is conventional and readily available on the market, and is locked in place along any of the mutually-aligned and opposed pairs of serrations formed in the male prong members 68 and 70. The actual pair of serrations used to lock the device is, of course, dependent upon the type of vehicle used, and may be set in conjunction with the second or ancillary brake light switch used in the invention, and indicated generally by reference numeral 80 in the Figures.

The ancillary brake light switch 80 is a conventional brake light switch, similar to that of brake light switch 16 commonly used in vehicles. The ancillary brake light switch 80 is a normally-closed switch which is rendered open by a contact plate extension 82, extending forwardly from the forward edge surface of the block 62 of the second locking arrangement, as shown in FIG. 4. The contact plate 82 acts as a push plate, in order to depress the contact button 84 of the ancillary brake light switch 80, when the brake pedal shoe 10 is secured to the brake pedal proper 12 and locked in place in its downward, brake-engaging state via the second locking arrangement 60, 68, 70. Thus, the positioning of the ancillary brake light switch 80 helps to determine which of the pair of serrations in the male prong member 68 and 70 determines the locking serrations thereof, which limits the downward movement of the block 60 therealong, to inherently define the locking position of the block 60. The contact plate 82, after having depressed the contact button 84 of the ancillary brake light switch 80, will render such ancillary brake light switch 80 into its open state, to thereby render inoperative the brake lights 20 of the vehicle, which otherwise, owing to the downward depression of the brake operating lever 14, would be continuously illuminated. The primary brake light switch 16 and the ancillary brake light switch 80 are connected in series with each other, as clearly shown in FIG. 5, where the vehicular battery 90 is in series with the first conventional brake light switch 16 shown in its open position, with the ancillary brake light switch 80 shown in its normally closed position when the brake pedal locking shoe 10 is not attached, so that upon the closing of the contacts of the brake light switch 16, via the depression of the brake pedal 12, the rear brake lights 20 will be illuminated in conventional manner. Upon the attachment of the brake pedal locking shoe 10 of the invention, and the locking of the pair of locks thereof, the contact plate 82 will render the ancillary brake light switch 80 into its open position, thereby opening the circuit between the vehicular battery 90 and the rear brake lights 20, to thereby prevent the actuation of the rear brake lights 20, to thereby prevent the drainage of the vehicular battery 90 while the brake pedal locking shoe 10 is in use. The ancillary brake light switch 80 is substantially identical in operation to the conventional brake light switch 16. The brake pedal locking shoe 10 is preferably made of carbon steel, with the locks made of brass.

While a specific embodiment of the invention has been shown and described, it is to be understood that numerous changes and modifications may be made therein without departing from the scope, spirit and intent of the invention as set forth in the appended claims.

What we claim is:

1. An anti-theft device for vehicles for use in retaining the brake pedal of the vehicle in its depressed, brake-engaging state to prevent the movement of the vehicle, comprising:

brake-pedal engaging means for contacting a brake pedal of a vehicle which is to be mad theft-proof;

means operatively engaged with said brake-pedal engaging means for retaining said brake-pedal engaging means in a first state thereof representative of the depression of the brake pedal engaged by said brake-pedal engaging means so that the brake pedal is in its downward, braking state for braking the wheels of the vehicle;

said brake-pedal engaging means comprising a first upper plate member contacting a surface portion of a brake pedal of a vehicle, and a second plate member, means for pivotally connecting said first and second plate members together to allow for relative rotation therebetween, a pair of spaced apart retaining means for sandwiching therebetween a portion of an operating brake lever of a vehicle, said pair of retaining means projecting downwardly from said first plate member, and means for locking said first and second plate members together to prevent relative rotation therebetween, so that said brake-pedal engaging means is fixedly locked to a brake pedal.

2. The anti-theft device according to claim 1, further comprising an ancillary brake light switch mounted to the floor of a vehicle, said switch comprising an actuating member; said brake-pedal engaging means comprising a contact member for actuating said actuating member of said ancillary brake light switch, whereby upon the installation of said brake-pedal engaging means to a brake pedal of a vehicle, said ancillary brake light switch will prevent the engergization of the rear brake lights of the vehicle.

3. The anti-theft device according to claim 2, wherein the said means for locking said first and second plate members comprises a first pivotal lever arm rotatable with respect to one of said pair of retaining means, and a lock proper comprising a slidable locking shaft, said pivotal lever arm having a through-hole formed therein for the reception therethrough of a portion of said locking shaft, said lock proper being mounted to the forward surface of said second plate member adjacent a lower edge surface thereof, whereby after said first and second plate members are secured to a brake pedal, said pivotal lever is locked in place via said locking shaft to thereby lock in place the brake pedal engaging means to a brake pedal.

4. The anti-theft device according to claim 3, wherein said means for locking said brake-pedal engaging means in place comprises a first male locking portion affixed to a portion of a floor of a vehicle, and a female portion affixed to said forward surface of said second plate member, said female portion comprising a block member defining at least one through-opening for the reception therethrough of said male member, said block member further comprising means for releasable locking in place said male member in said at least one through opening, whereby said means for locking retains said brake- pedal engaging means and a brake pedal in a depressed state thereof, whereby the brake pedal is operatively engaged to prevent movement of the wheels of a vehicle.

5. The anti-theft device according to claim 4, wherein each of said means for locking said brake pedal and said means for locking said first and second plate members comprises key operating means for actuating and releasing said respective means.

6. The anti-theft device according to claim 5, further comprising an ancillary brake light switch for rendering inoperative the rear brake lights of a vehicle, said block member comprising a forwardly extending contact plate for actuating the said ancillary brake light switch to render inoperative the rear brake lights when said brake-pedal engaging means is attached to a brake pedal of a vehicle and said means for retaining locks said brake-pedal engaging means in the downward, depressed state thereof.

7. In a vehicle comprising a brake pedal proper, a rotatable brake operating level to the exterior end of which is attached said brake pedal proper, a brake light switch operatively coupled with said rotatable brake lever, and a floor directly beneath said brake pedal proper and said rotatable brake lever, wherein the improvement comprises:

means for retaining said brake pedal proper and said brake operating level in the downward brake-engaging state to prevent the movement of the vehicle by preventing the rotation of the rear wheels thereof;

said means for retaining said brake pedal proper in its depressed state comprising a brake-pedal locking shoe, first means for locking said shoe to said brake pedal, and means affixed to the floor of the vehicle for operative engagement with said shoe for holding said shoe in a downward state where said brake pedal is in its depressed operative brake-engaging position;

said shoe comprising a first plate member contacting the upper surface of said brake pedal, a second plate member pivotally connected to said first plate member and extending substantially downwardly therefrom, each of said first and second plate members defining a lateral edge surface, means for pivotally connecting said lateral edge surfaces of said first and second plate members, whereby said first and second plate members are rotational relative to each other; a first and a second substantially downwardly-projecting bracket means extending from said first plate member, said first and second bracket means being spaced apart and defining a space therebetween, said first and second bracket means sandwiching therebetween a portion of said brake operating lever, said means for locking said shoe to said brake pedal comprising a first portion fixedly connected to one of said pair of bracket means, said means for locking said shoe further comprising a second portion fixedly connected to a portion of said second plate member for cooperation with said first portion thereof, whereby said first and second portions of said means for locking cooperate to lock said first and second plate members in place to prevent relative rotation therebetween, whereby said shoe is fixedly locked with respect to said brake pedal proper.

8. The improvement according to claim 7, wherein said means for locking further comprises key operating means for releasably unlocking said means via a key; said first portion comprising a rotatable lever having a through-hole formed therein, and said second portion comprising a slidable locking shaft for insertion through said through opening when said first and second portions are locked together.

9. The improvement according to claim 7, wherein said improvement further comprises an ancillary brake light switch affixed to said floor forwardly of said means for locking, said ancillary brake light switch comprising an actuating member, said first plate member having a contact plate projecting forwardly therefrom for contact against said actuating member of said ancillary brake light switch for causing said ancillary brake light switch to be in an open state thereof, whereby said rear brake lights of said vehicle are rendered de-energized when said brake pedal is depressed into its operative state.

10. The improvement according to claim 9, wherein said ancillary brake light switch is electrically connected in series with said brake light switch operatively coupled with said brake operating lever, said ancillary brake light switch being a normally closed switch.

* * * * *